(12) United States Patent
Woo et al.

(10) Patent No.: US 7,498,985 B1
(45) Date of Patent: Mar. 3, 2009

(54) GEO-FENCING GPS-ENABLING ASSETS

(76) Inventors: Arthur N. Woo, 21577 Villa Maria Ct., Cupertino, CA (US) 95014; Jose Briceno, Nishi-Oi 4-19-8, Shinggawa-ku, Tokyo 140 (JP)

( * ) Notice: Subject to any disclaimer, the term of this patent is extended or adjusted under 35 U.S.C. 154(b) by 79 days.

(21) Appl. No.: 11/479,808

(22) Filed: Jun. 29, 2006

(51) Int. Cl.
*G01S 5/14* (2006.01)
(52) U.S. Cl. .................................................. 342/357.17
(58) Field of Classification Search ............ 342/357.07, 342/357.09, 357.17
See application file for complete search history.

(56) References Cited

U.S. PATENT DOCUMENTS

| | | | | |
|---|---|---|---|---|
| 5,640,452 | A | * | 6/1997 | Murphy ................. 342/357.17 |
| 6,166,688 | A | * | 12/2000 | Cromer et al. ......... 342/357.17 |
| 6,813,498 | B1 | * | 11/2004 | Durga et al. ........... 342/357.07 |
| 2005/0221841 | A1 | * | 10/2005 | Piccionelli et al. ....... 455/456.1 |
| 2006/0105758 | A1 | * | 5/2006 | Maislos ................. 455/456.1 |
| 2007/0049295 | A1 | * | 3/2007 | Soliman et al. ......... 455/456.3 |

* cited by examiner

*Primary Examiner*—Thomas H. Tarcza
*Assistant Examiner*—F. H. Mull
(74) *Attorney, Agent, or Firm*—Law Offices of Thomas E. Schatzel, A Prof. Corp.

(57) ABSTRACT

A security system comprises a secured asset associated with a high-sensitivity GPS receiver that can receive network aiding information. Indoors, the pseudo-ranges from orbiting GPS satellites can be computed by using digital correlators to pull directly received satellite signal transmissions from the noise floor, but the NAV-data transmissions cannot be demodulated well enough due to the attenuation caused by the building structure. So a wireless network is relied upon to provide aiding information that supplies the almanac and ephemeredes. The fact that the NAV-data transmissions cannot be demodulated well enough is taken as indicia that the system is being operated indoors, and such can be used in a geo-fence control to decide if indoor or outdoor use is not permitted. The secured asset can be temporarily or permanently disabled according to such geo-fence controls.

5 Claims, 1 Drawing Sheet

GEO-FENCING GPS-ENABLING ASSETS

FIELD OF THE INVENTION

Figure 1:
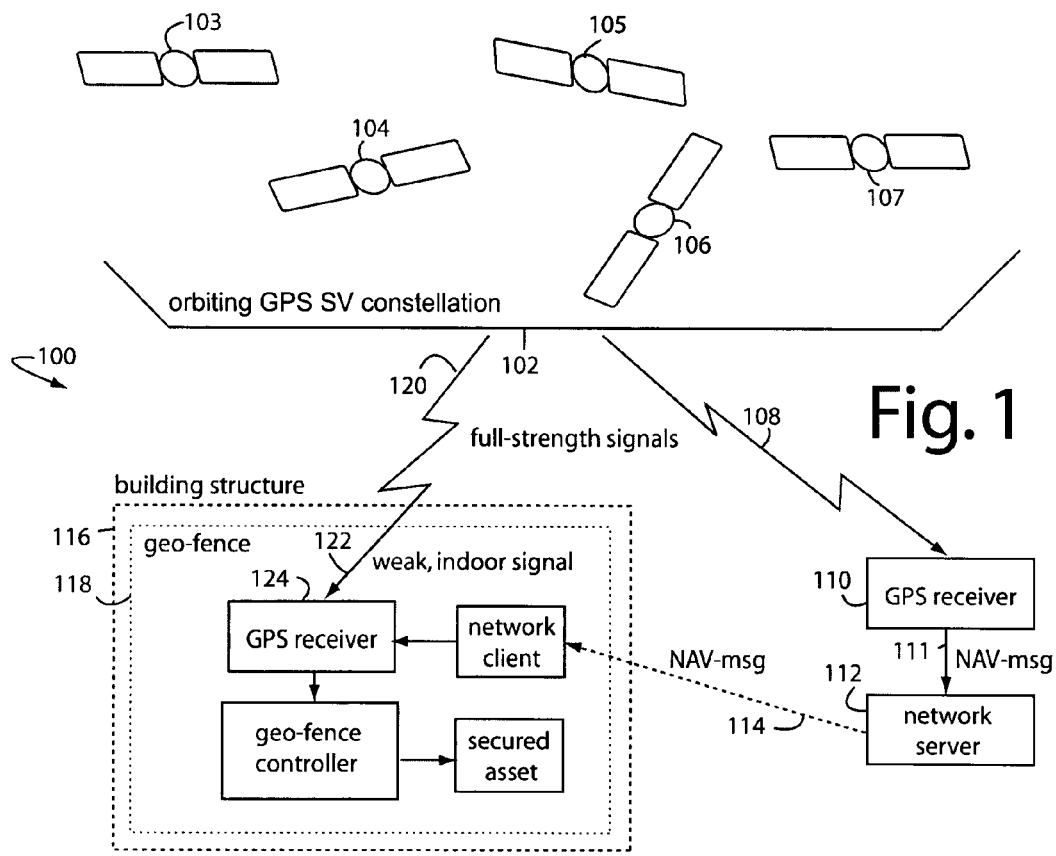

The present invention relates to asset security systems, and more particularly to methods and circuits for using GPS navigation receivers to disable an asset and announce that it is outside a permitted area.

DESCRIPTION OF THE PRIOR ART

Many assets have highly constrained areas of permitted operation and use. For example, rental car agencies do not allow some of their cars to be taken out-of-state, employers do not allow employees to take their laptop computers away from the company campus, and classified devices should not be operable outside secure "green zones".

With GPS, it is not only possible to compute the x,y,z three dimensional position of a user, but also the exact time and velocity. Most GPS receivers are restricted by US Government regulations from producing position fixes if the GPS receiver is traveling faster than would be normal for an airplane. For example, a missile would be very fast and disabling the GPS receiver in this way would prevent an unauthorized military application. This is a preexisting form of geo-fencing based on a velocity constraint.

Bank safes are well-known for having time-locks. These devices put a time constraint on when the safe can be normally opened, e.g., during business hours on business days. GPS receivers could be used to put very reliable time locks on a wide variety of assets, especially electronic ones where the protective measures would simply involve disabling the protected device from operating.

Prior art applications of geofencing typically generate some alarm or alert that is sent to a security agency or police enforcement. Automobile applications of geofencing that disable the car itself if operated outside a permitted zone, or inside a disallowed zone, are conventional too.

The prior art has been quiet on systems that can detect movement indoors or outdoors. Such could be implemented with GPS systems that simply look at the three dimensional position fix and compare that against a mathematical model of a building. But such an implementation would be very inflexible because models would have to be loaded for every building, and expensive because the models would take a lot of effort to construct.

Some assets are only properly used indoors. If they are detected outdoors, it is a signal that some unauthorized activity has occurred. Such could be the only indicia that a predefined geo-fence boundary has been exceeded. It could occur that the time and place are correct for operation, but evidence exists that the device is outdoors. Or, the only constraint could be that the device is indoors, and its being outdoors indicates a violation of security rules, contract terms, or warranty.

GPS receivers demodulate and range transmissions from orbiting satellites to determine their relative distance to the satellite's location at the instant of transmission. If enough satellites with good geometry can be received, it is possible to make an autonomous standalone determination of the receiver's accurate position. Otherwise, external information will be needed to compute position.

Such externally supplied aiding information can be supplied from a number of sources. So-called assisted-GPS (A-GPS) receiver technology uses the mobile phone infrastructure to minimize the cost/complexity of GPS handset. A-GPS can also make position solutions possible under more difficult satellite signal level conditions. The cellular network signal is very strong in a small region around a cellular base station so a high signal-to-noise-ratio (SNR) can be guaranteed for reliable low bit-error-rate reception. Good signals can support high-data-rate signals for voice, Internet, or data services.

A positioning session starts with a request made by the mobile phone that is sent to the cellular infrastructure. The infrastructure can assume an approximate location for the A-GPS receiver because it will be close to a cellular base station with a known, fixed location. The data communications channel itself is used to communicate important satellite data which has been continuously collected by another GPS receiver beforehand. So the need to demodulate data from the satellite itself is eliminated. However, some of the key ranging information which is the signal reception timing is not received in the A-GPS receiver. However, this can be overcome because it only needs to compute a location very nearby the cellular base station and it can also receive accurate time transfer from the cellular infrastructure.

Thus, A-GPS simplifies the location determination by only requiring the A-GPS hardware to do a small part of the normal SPS signal processing, that is, it must only measure the codephase, which is the part of the range that is less than one cycle of pseudorandom noise (PRN) sequence that is bi-phase modulated onto the GPS carrier signal. The PRN sequence with GPS is 1023-bits long and repeats every millisecond. The geometric range is 60-85-milliseconds, but A-GPS hardware only measures the so-called fractional phase of the range. The data demodulation and the larger part of the range determination are done elsewhere. E.g., inside the cellular communications infrastructure.

Finding the codephase only requires the hardware to test a range of hypotheses of the code phase and frequency of the pseudorandom noise (PRN) signal. Knowing approximate location and time, as well as having an accurate frequency reference and a way to predict the nominal satellite Doppler, will greatly reduce the number of codephase and frequency hypotheses needed. Methods to reduce the search space are well known and are taught by Taylor '118.

A smaller search box means more time can be spent at each hypothesis. The luxury of being able to spend more time can be used to improve the signal-to-noise ratio (SNR). An improved SNR allows the signal to be found in more demanding conditions. Thus at each code and frequency hypothesis, an A-GPS receiver sums the in-phase and quadrature components of the down-converted signal before squaring to form power, and then sums power after squaring. This is called coherent integration followed by non-coherent integration. The variance of these sums decrease with integration time, allowing a power that is above the noise power average to be detected. The standard deviation plus noise average drops below the signal power.

Taylor, et al., U.S. Pat. No. 4,445,118, issued in 1984 (Taylor '118), describe aiding an SPS receiver with an approximate position of a nearby transmitter, e.g., a radio tower or satellite. A benefit of providing such externally sourced information is a faster acquisition time because of the improved starting guess of the satellite Doppler observed at this location. Taylor '118 teaches transmitting the information at a carrier frequency similar to the SPS satellite frequency so both signals can be tuned by the same receiver hardware.

Krasner, in U.S. Pat. No. 6,208,290, (Krasner '290) describes a similar position aiding scheme. A cell-based communication system has an SPS receiver effectively embedded into a cellular network. The aiding improvement is similar to that taught by Taylor '118. The prosecution history of Krasner '290 teaches its SPS receiver and cell-based communications receiver do not share a common communication link.

A cell-based information source, like that described by Krasner '290, gets its aiding information from the cell itself as the data source. Krasner '290 describes a cellular network infrastructure with cell sites and cellular service areas supplemented by a GPS Server. Such is directly connected to the cellular switching center, the land based network, and a query terminal. In this system, a request for service, as a result of an emergency e-911 position request or other service request, enters the network according to the number of cellular mobile subscriber. The response is processed from inside the cellular network infrastructure, which is closed to the general public.

The location determination of the cell base stations or cellular service areas themselves is not specified directly, but it is implied and logical that those positions are determined according to the actual physical layout of the network. For normal operation, all sites are known because they have been keyed into the cell base information source, and thus, can be assumed to be known by the cellular operator. Krasner '290 defines a cell base information source as the cellular communication infrastructure with an embedded GPS server. In this setting, a request for position migrates through different parts of the system so that the approximate position that assists in the position determination comes from inside the cellular network. In effect, Taylor '118 applies to providing information from the point of view of cellular network provider which has access to all parts of the infrastructure, and thus can exploit the characteristics of such a network.

Krasner '290 assumes the client has access to an accurate database for most all cellular base stations at all times of product operation and life.

Demodulating the 50-bits-per-second GPS navigation data message (navData) requires specialized hardware and software capabilities. After finding the signal in the larger search, early-punctual-and late code hypotheses are centered at the best codephase and frequency hypothesis for both the in-phase and quadrature channels of the down-converted signal. Early and late correlators are used to drive a code tracking loop that pushes the punctual code to the top of the autocorrelation peak, e.g., to get maximum signal power and the best estimate of the codephase. The punctual correlators are used to form a frequency error discriminator that eases the frequency error towards zero. The 180-degree phase shifts of the carrier caused by the bi-phase modulation of the navData can then be observed in the frequency error discriminator.

Assisted global positioning system (A-GPS) takes advantage of information obtainable from a cellular based infrastructure that would be useful in a GPS receiver. For example, the Qualcomm A-GPS receiver is low cost and simple because it shares hardware and information between the cellular communication system and GPS receiver. It is not considered an autonomous satellite positioning system (SPS) receiver because the hardware can only measure the fractional part of the total range. It does not demodulate the SPS data message which includes the timing information needed to form a total pseudorange. Instead, it uses an estimated total pseudorange based on the known nearby cell station position. So it can only compute a relative position that is within a circle of the true position. Such has a radius that is one half the theoretical maximum fractional range. In the GPS case for example, the 1023-chip PRN sequence is one millisecond long, which is a ranging distance of roughly 300-km. So the working range is roughly ±150-km around the approximate location.

If the GPS receiver's clock offset from GPS time is not known, then the fractional range measurement is referred to as a fractional pseudorange because it contains the sub-millisecond portion of such clock offset. When the clock uncertainty grows to ±0.5-millisecond, then the relative positioning working range is reduced to only ±75-km because of an ambiguity of whether the addition of the clock bias rolls the fractional pseudorange by plus or minus one millisecond. Such effect is different on each satellite and occasionally it is impossible to resolve if the position error exceeds 75-km. However, in both cases of whether the measurement is fractional range or fractional pseudorange, the 75-km working range is more than the range to typical coverage of cellular base station.

The Qualcomm A-GPS receiver is implemented in one of two embodiments, a Mobile Station Based method (MS-based) that receives a starting position of the nearest cell site and the ephemeris for its visible satellites, or a Mobile Station Assisted (MS-Assist) positioning mode that receives the visible satellites and their expected Doppler. In MS-based, the position is computed in the receiver. In MS-Assisted, the fractional pseudoranges are returned to the network and the position is computed inside the cellular network. In both cases, search time is improved when the Doppler is computed at from the approximate location.

In the A-GPS receiver, the SPS satellite information is not collected in the Mobile Station SPS receiver. Such is both for simplicity and also because the collection is not required with such a tight integration of the SPS receiver and the communication receiver. The SPS satellite data message can always be collected at a remote location connect to the cell-based information source so that satellite position data is available for either method. Also, since the cell station is always within 75-km, additional timing is not needed to form total pseudorange.

The A-GPS receiver derives its time and frequency directly from the cell-based infrastructure. For example, the local oscillator for the SPS signal downconversion and sampling is synthesized directly from the oscillator used to downconvert and lock to the communication signal from the cellular base station signal. Such removes the need for a separate SPS oscillator and also improves knowledge of the frequency reference for the SPS receiver when the cell base station clock is itself synchronized to an accurate time and frequency standard.

Time is derived from data messages in the cellular communication signal protocol, and can be improved using additional round-trip-time propagation measurements that can be made between the base station and the mobile station.

A-GPS receivers that rely on the cell-based communication receiver downconverter oscillator cannot operate unless the communication receiver is on and is also locked to the base station. Thus a position request requires a handshake with the communication receiver to take it out of sleep mode if it currently in that mode.

The A-GPS receiver is intimately tied to the cellular network and cell-based information source for normal operation. The location services that the network can provide are only enabled by the operator of the cellular network for authorized clients who both have the required A-GPS hardware and are also subscribers to that service. The implication from the embodiments and drawing demonstrate that a position request ripples through many parts of the system. The cell-based information source is not available to non-subscribers.

By contrast, the conventional SPS receiver has its own low cost oscillator and time source, such as a local 32-kHz low power oscillator, and can only determine its time and frequency information by receiving timing information from the SPS satellites. In addition, the conventional SPS receiver must contain hardware that can observe the SPS carrier frequency phase so that data message and timing message on the SPS carrier can be demodulated. Otherwise it has no way to obtain the time data and satellite position data.

The conventional SPS receiver can compute an autonomous fix because it can measure total pseudorange by observing the local time of the reception of transmission timing data in the SPS data message. The total pseudorange is measured as the difference between the received and transmitted time stamp where the received time stamp is the local millisecond time of the received data bits plus the phase of local PRN code sequence where maximum correlation is observed, e.g., the fractional pseudorange. The transmitted time stamp is the value in the data message. Such capability allows the position to be calculated without a known starting reference point. In other words, it can start its searching and position estimation at any position, such as the center of the Earth. The autonomous receiver has an advantage of being able to fix independent of aiding information. The A-GPS receiver can only fix relative to a known location provided by the cell-based information source.

The cell site position information is not generally available even when using the cellular signal. Currently, most cellular operators closely protect the cell site position information for competitive and business reasons. Access to the cell-based information source described by Krasner '290 is only available through deep integration of the SPS receiver hardware into the mobile phone and cell-based network infrastructure. Even for a device that subscribes to the location base services of an operator, it still does not have direct or independent access to the cell base information source. The MS-Assist method means the relative position does not even need to be sent to the mobile station. Such provides even more security against divulging the cell position.

What is needed is a reliable and secure device that can inexpensively detect and enforce geo-fences, especially those that constrain operation to indoor/outdoor use.

SUMMARY OF THE INVENTION

Briefly, a security system embodiment of the present invention comprises a secured-asset associated with a high-sensitivity GPS receiver that can receive network aiding information. Indoors, the pseudo-ranges from orbiting GPS satellites can be computed by using digital correlators to pull directly received satellite signal transmissions from the noise floor, but the NAV-data transmissions cannot be demodulated well enough due to the attenuation caused by the building structure. So a wireless network is relied upon to provide aiding information that supplies the almanac and ephemeredes. The fact that the NAV-data transmissions cannot be demodulated well enough is taken as indicia that the system is being operated indoors, and such can be used in a geo-fence control to decide if indoor or outdoor use is not permitted. The secured asset can be temporarily or permanently disabled according to such geo-fence controls.

An advantage of the present invention is that a security system is provided to protect against particular assets from being used in non-authorized places.

A further advantage of the present invention is a method is provided for the automatic determination of indoor/outdoor location of a secured-asset in a geofence application.

A still further advantage of the present invention is a geofence device is provided that can temporarily or permanently disable a secured-asset according to predefined rules.

These and other objects and advantages of the present invention will no doubt become obvious to those of ordinary skill in the art after having read the following detailed description of the preferred embodiments which are illustrated in the various drawing figures.

IN THE DRAWINGS

Figure 2:
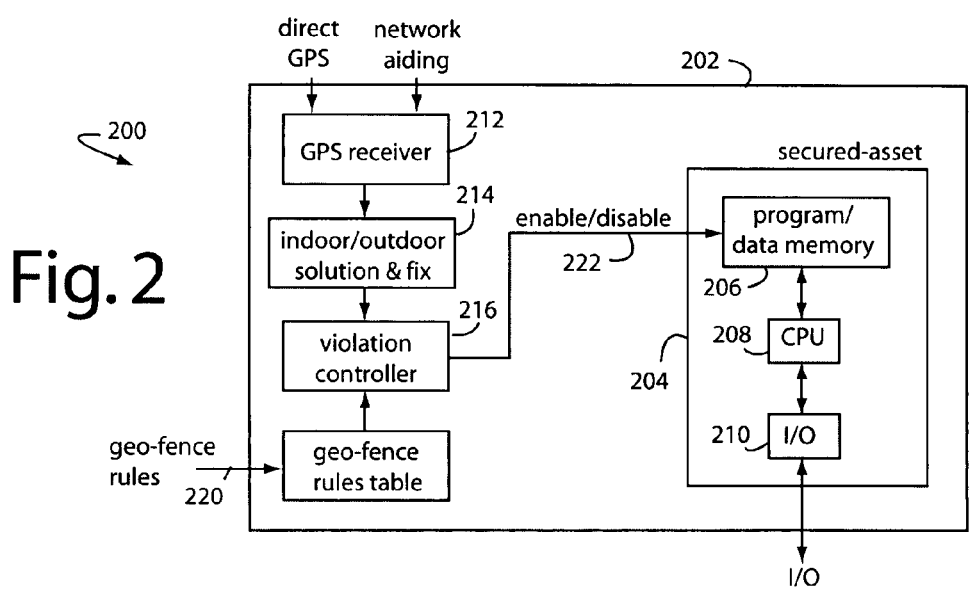

FIG. 1 is a functional block diagram of a geofence security system embodiment of the present invention; and FIG. 2 is a functional block diagram of a portable device embodiment of the present invention useful in the system of FIG. 1.

DETAILED DESCRIPTION OF THE PREFERRED EMBODIMENT

FIG. 1 illustrates a geofence security system embodiment of the present invention, and is referred to herein by the general reference numeral 100. A constellation 102 of orbiting GPS satellites 103-107 transmits full-strength signals 108 that are received by a GPS reference station receiver 110. Such signals 108 include a 50-Hz navigation message (NAV-msg) that describes the satellites' ephemeredes and provides the GPS almanac. At a minimum, a NAV-msg data 111 is extracted and provided to a network server 112. A NAV-msg download 114 is available over the network to clients that need and request it. For example in a business model embodiment of the present invention, such NAV-msg downloads 114 are available to subscribers over the Internet that are connected via WiFi or cellular GPRS services.

A building structure 116 can provide a secure location within which can be deployed high value assets. Geofence restrictions can be placed on where such assets are allowed to roam, and what the consequences are. For example, a geofence 118 can be defined to include the indoor spaces of the building structure 116, and the appliance can be disabled as long as it is outdoors. Or, the appliance can be permanently disabled the first time it is moved outdoors, e.g., where theft or sabotage is probable. Permanent disablement of electronic devices may include the erasing of the main program and data memory, e.g., an operating system or application program in flash or disk memory.

Another group of full strength signals 120 from the GPS satellite constellation 102 will be attenuated and weakened when they pass through the building structure 116. Indoors, these weaker signals 122 will nevertheless be received by a portable GPS receiver 124. The nature of the weak GPS signals 122, and GPS-CDMA modulation techniques, is such that GPS receiver 124 can compute pseudoranges to the GPS satellites 103-107 by using its digital correlators to process the signals and bring them out of the background noise. But such techniques cannot be used to recover the 50-Hz navigation message if the signal is too faint. Indoors, signal levels can drop below −150 dBm and cause too many parity errors in the 5-Hz navigation message demodulation. The GPS receiver 124 could produce a position fix if it can obtain a copy of the navigation message from another source.

At a bare minimum, aiding information is not needed to determine indoor status, the simple fact of trouble demodulating 50-Hz NAV-data message, but being able to track satellites anyway, can be taken as an indication of being indoors. Such indication is thereafter useful in applying geofence criteria.

FIG. 2 shows a portable device embodiment of the present invention, which is referred to herein by the general reference numeral 200. Device 200 comprises a protective housing 202 with a secured-asset 204. In a typical application, the secured-asset 204 comprises an erasable program/data memory 206 connected to a microcomputer (CPU) 208 with an input/output (I/O) peripheral 210. The secured-asset 204 can be any of a range of valuable commodities that must not be taken outside their indoor/outdoor geofence. Such includes computers, receivers of all sorts, entertainment devices, phones, financial instruments, weapons, etc. Such are necessarily equipped with some means to be disabled, either temporarily or permanently, e.g., to enforce the rules for violation of a geofence.

A GPS receiver 212 receives both direct transmissions from orbiting GPS satellites and aiding information from a network. An analysis of these signals by the GPS receiver 212 can determine, at a minimum, if the protective housing 202 and its contents are indoors or outdoors. A solution fix 214 is provided to a violation controller 216. Geofence rules table provides a set of downloaded geofence rules 220 for comparison. Such rules may be loaded during manufacturing, or downloaded through a wireless network attached to the Internet. An enable/disable signal 222 is provided to the secured-asset 204 to permit or cease operation of the asset. Such can be made to cause a permanent disablement by destroying a critical component, or irreversible erasing an operating system or application program.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the "true" spirit and scope of the invention.

What is claimed is:

1. A geo-fence security system, comprising:
   a portable GPS navigation receiver;
   a NAV-data demodulator included in the receiver that can produce navigation messages without errors if the GPS navigation receiver is operating outdoors, and that may produce navigation message errors if the GPS navigation receiver is operating indoors;
   a table of geo-fence rules including whether the presence and/or operation of a collocated and an interconnected secured-asset is permitted indoors or outdoors; and
   secured-asset disablement means for disabling said secured-asset depending on data loaded in the table of geo-fence rules, and depending on interpretations of signals received by the NAV-data demodulator.

2. The geo-fence security system of claim 1, further comprising:
   a wireless network receiver for obtaining navigation message data from a network when the NAV-data demodulator does not have a good enough signal directly received from orbiting satellites to extract its own copy of a navigation message;
   wherein the portable GPS navigation receiver is enabled to compute position fixes with a network-obtained navigation message data, and such position fixes are useful by the secure asset disablement means as further indicia of permitted use according to data loaded in the table of geo-fence rules.

3. The geo-fence security system of claim 1, further comprising:
   an erasable memory disposed in the secured asset and providing program or memory storage; and
   a secure asset disablement control signal connected to cause the erasure of the erasable memory.

4. A geofence method, comprising:
   establishing geofence rules related to indoor/outdoor locations for a particular secured-asset;
   attempting to demodulate a directly broadcast 50-Hz navigation message with a collocated GPS receiver;
   determining whether said particular secured-asset is indoors/outdoors depending on the success in being able to demodulate said directly broadcast 50-Hz navigation message; and
   disabling said particular secured-asset if a test of indoor/outdoor location indicates a violation of said geofence rules.

5. The method of claim 4, further comprising:
   aiding said collocated GPS receiver with a network supplied copy of a navigation message so it can provide a position fix that will also help in determining whether said particular secured-asset has been moved in violation of said geofence rules.

* * * * *